United States Patent
Sakamoto

(10) Patent No.: US 11,180,832 B2
(45) Date of Patent: Nov. 23, 2021

(54) MAGNESIUM-LITHIUM ALLOY MEMBER, MANUFACTURING METHOD THEREOF, OPTICAL APPARATUS, IMAGING APPARATUS, ELECTRONIC APPARATUS AND MOBILE OBJECT

(71) Applicant: CANON KABUSHIKI KAISHA, Tokyo (JP)

(72) Inventor: Jun-ichi Sakamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 69 days.

(21) Appl. No.: 16/708,828

(22) Filed: Dec. 10, 2019

(65) Prior Publication Data
US 2020/0190636 A1    Jun. 18, 2020

(30) Foreign Application Priority Data

Dec. 17, 2018 (JP) ............................. JP2018-235922
Dec. 2, 2019 (JP) ............................. JP2019-218402

(51) Int. Cl.
*C22C 23/00* (2006.01)
*C25D 11/30* (2006.01)
*C23F 1/22* (2006.01)

(52) U.S. Cl.
CPC ............... *C22C 23/00* (2013.01); *C23F 1/22* (2013.01); *C25D 11/30* (2013.01)

(58) Field of Classification Search
None
See application file for complete search history.

(56) References Cited

U.S. PATENT DOCUMENTS

| | | | |
|---|---|---|---|
| 5,240,589 A | 8/1993 | Bartak et al. | |
| 5,470,664 A | 11/1995 | Bartak et al. | |
| 5,652,067 A * | 7/1997 | Ito | H01L 51/5048 313/500 |
| 8,233,219 B2 * | 7/2012 | Takada | G02B 5/285 359/588 |
| 9,708,700 B2 | 7/2017 | Kin et al. | |
| 2005/0042440 A1 * | 2/2005 | Bach | C23C 12/02 428/332 |
| 2007/0039829 A1 | 2/2007 | Pearson et al. | |
| 2013/0094093 A1 * | 4/2013 | Tanaka | G02B 1/113 359/642 |
| 2017/0121841 A1 | 5/2017 | Dolan et al. | |

FOREIGN PATENT DOCUMENTS

| | | |
|---|---|---|
| CN | 1080671 A | 1/1994 |
| CN | 102428213 A | 4/2012 |
| CN | 102753714 A | 10/2012 |

(Continued)

OTHER PUBLICATIONS

First Office Action in Chinese Application No. 201911297355.0 (dated Aug. 2021).

*Primary Examiner* — Allan W. Olsen
(74) *Attorney, Agent, or Firm* — Venable LLP

(57) ABSTRACT

Provided is an alloy member including a substrate made of magnesium-lithium alloy with a sum of content of magnesium and content of lithium of 90 mass % or more and a coating film disposed on the substrate. The coating film contains fluorine and oxygen, with a fluorine content of more than 50 atom % and an oxygen content of less than 5 atom %.

13 Claims, 11 Drawing Sheets

EXAMPLE 2

(56) References Cited

FOREIGN PATENT DOCUMENTS

| | | | |
|---|---|---|---|
| CN | 102762768 | A | 10/2012 |
| CN | 104131326 | A | 11/2014 |
| CN | 106715762 | A | 5/2017 |
| CN | 107699935 | A | 2/2018 |
| CN | 108359868 | A | 8/2018 |
| JP | 2003-171776 | A | 6/2003 |
| WO | 2014/203919 | A1 | 12/2014 |
| WO | 2016010541 | A1 | 1/2016 |

* cited by examiner

MAGNESIUM-LITHIUM ALLOY MEMBER, MANUFACTURING METHOD THEREOF, OPTICAL APPARATUS, IMAGING APPARATUS, ELECTRONIC APPARATUS AND MOBILE OBJECT

BACKGROUND OF THE INVENTION

Field of the Invention

The present invention relates to a magnesium-lithium alloy member having a coating film containing a large amount of fluorine on a substrate of magnesium-lithium alloy.

Description of the Related Art

Having light weight and excellent damping properties, a magnesium alloy is used in various articles. In recent years, further weight saving has been required for articles, so that use of magnesium-lithium alloy is proposed. However, lithium is a metal element which is very active, easily ionized and dissolved, having poor corrosion resistant properties when exposed to a high-temperature and high-humidity environment. Therefore, improvement in the corrosion resistance of magnesium-lithium alloy is required.

It is known that in order to improve the corrosion resistance of magnesium-lithium alloy, the surface of the magnesium-lithium alloy is subjected to fluorination to form a fluorinated coating film on the surface. Japanese Patent Application Laid-Open No. 2003-171776 discloses that a dip treatment of the surface of magnesium-lithium alloy with a treatment liquid containing acidic ammonium fluoride and aluminum. Besides, International Publication No. WO2014/203919 discloses that a conversion treatment of the surface of magnesium-lithium alloy with hydrogen fluoride.

However, the conventional methods were unable to allow the surface of magnesium-lithium alloy to contain a large amount of fluorine. Therefore, a conventional magnesium-lithium alloy member has insufficient corrosion resistance.

SUMMARY OF THE INVENTION

An alloy member for solving such problems as described above is characterized by comprising: a substrate made of magnesium-lithium alloy with a sum of content of magnesium and content of lithium of 90 mass % or more; and a coating film disposed on the substrate, wherein the coating film contains fluorine and oxygen, with a fluorine content of more than 50 atom %, and an oxygen content of less than 5 atom %.

A method for manufacturing an alloy member for solving the above problems is characterized by comprising: providing a substrate made of magnesium-lithium alloy with a sum of content of magnesium and content of lithium of 90 mass % or more; disposing a cathode substrate and the substrate made of magnesium-lithium alloy as an anode in an aqueous solution of neutral ammonium fluoride; and applying a voltage between the anode and the cathode to dispose a coating film on the substrates; wherein the coating film contains fluorine and oxygen, with a fluorine content of more than 50 atom % and an oxygen content of less than 5 atom %.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

<Alloy Member>

Figure 1:
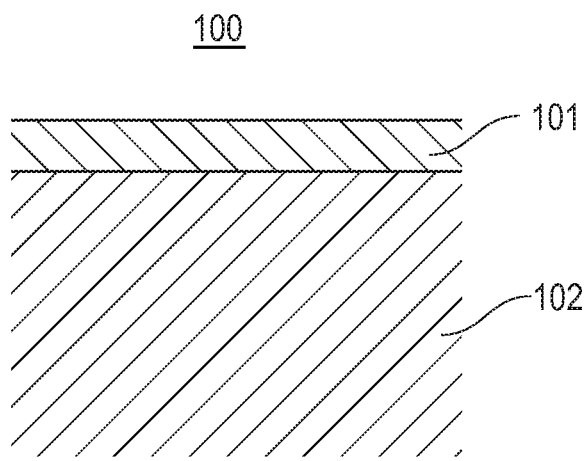
FIG. 1 is a partial sectional view illustrating an alloy member of the present invention.

FIG. 1 is a partial sectional view illustrating an alloy member of the present invention. An alloy member 100 includes a substrate 102 made of magnesium-lithium alloy and a coating film 101 disposed on the substrate 102. A coat such as a primer and an overcoat layer may be disposed on the coating film 101 on an as needed basis. Examples of the coat include a heat-shielding film having a heat-shielding function.

(Substrate)

The substrate 102 is made of magnesium-lithium alloy (hereinafter referred to as Mg—Li alloy). The Mg—Li alloy includes Mg (magnesium) as a main ingredient, having light weight and excellent damping properties. The excellent damping properties means that vibration is quickly settled through rapid conversion of vibration energy into thermal energy.

In the present specification, an Mg—Li alloy means an alloy with a total content of Mg and Li of 90 mass % or more in the alloy. With a content of Mg and Li of less than 90 mass %, it becomes difficult to achieve weight saving. Another metal element may be contained in the Mg—Li alloy in order to adjust properties thereof, as long as the content of the other metal element is less than 10 mass %. Examples of the metal element include Al, Zn and Ca.

The raw material of the Mg—Li alloy is not particularly limited. Examples of the material commercially available include a rolled plate material LZ91 manufactured by Amli Materials Technology Co., Ltd., a forged molding material Ares manufactured by Amli Materials Technology Co., Ltd., a rolled plate material LA143 and a thixomolded tube material LA149 manufactured by Santoku Corporation.

The lithium content in the Mg—Li alloy is preferably 0.5 mass % or more and 15 mass % or less relative to the sum of the Mg content and the Li content. With a lithium content of less than 0.5 mass %, weight saving of the Mg alloy cannot be achieved, while with a lithium content of more than 15 mass %, damping properties may be insufficient. More preferably, the lithium content is 8 mass % or more and 14 mass % or less.

Since Li is a base metal, a conventional Mg—Li alloy is easily corroded. Specifically, corrosion of a conventional Mg—Li alloy cannot be inhibited, when the alloy is exposed to a high-temperature, high-humidity environment at a temperature of 55° C. and a humidity of 95% for a long period. When water attaches to the surface of an Mg—Li alloy, Li reacts with water to form lithium hydroxide, and in addition to that hydrogen gas is generated. The hydrogen gas causes the film formed by surface treatment of the Mg—Li alloy to swell or peel off in some cases. It is therefore required to provide a coating film capable of suppressing generation of hydrogen gas even when water comes into contact with the surface of the Mg—Li alloy.

(Coating Film)

A coating film 101 contains fluorine (F) and oxygen (O), with a content of the fluorine of more than 50 atom % and a content of the oxygen of less than 5 atom %. Disposition of the coating film 101 with the features described above on the substrate 102 of Mg—Li alloy enables the generation of hydrogen gas to be suppressed even when contacted with water.

The reason is that with a content of F in the coating film 101 of more than 50 atom % enables a large amount of fluorides which are inert to water and oxygen to be formed in the coating film, even when release of Li occurs. As the fluorides, not only LiF (lithium fluoride) but also $MgF_2$ (magnesium fluoride) is formed. These fluorides have a small enthalpy. Also, these fluorides have a small solubility in water.

Also, while setting the content of F to more than 50 atom %, the content of O is set to less than 5 atom %. With a content of O of less than 5 atom %, the activation of Li and the generation of $Li_2O$ (lithium oxide) is suppressed, so that the generation of hydrogen gas can be suppressed. With a content of O of more than 5 atom %, $Li_2O$ is generated. $Li_2O$ reacts with water to change into lithium hydroxide having a large solubility in water, resulting in the generation of hydrogen.

From the viewpoint of easiness in production, the content of F can be 70 atom % or less. From the same viewpoint, the content of O can be 2 atom % or more.

The thickness of the coating film 101 can be 25 μm or more. With a thickness of the coating film of 25 μm or more, defects occurring in the coating film can be reduced. As a result, even when water soaks from the coating film surface, the possibility of water reaching the substrate 102 can be reduced.

When the content of fluorine in the coating film 101 is represented as M1 atom % and the sum of the content of magnesium and lithium as M2 atom %, the coating film 101 can have a region where M1 is two times or more M2.

In the case where the LiF composition is at stoichiometric ratio, the proportion of F is 50 atom %. Also, in the case where the $MgF_2$ composition is at stoichiometric ratio, the proportion of F is 66.7 atom %. In other words, when Mg and Li in the surface of Mg—Li alloy as substrate are completely fluorinated, the proportion of F is between 50 atom % and 66.7 atom %.

Having a region where the content M1 of fluorine in the coating film 101 is two times or more M2 as the sum of the content of magnesium and lithium, therefore, means that fluorine in an amount more than the proportion corresponding to complete fluorination of Mg and Li is present. Due to the presence of the surplus fluorine, even when active lithium and magnesium are generated, fluorine reacts with these active species to form stable fluorides, so that corrosion can be suppressed even under a more severe environment.

The region can be formed at a location within 10 μm in the thickness direction from the surface of the coating film. Further, the region can be continuously formed up to a location within 20 μm in the thickness direction from the surface of the coating film. The reason is that, in any case, the structure hardly reacts with water at the coating film surface.

<Manufacturing Method of Alloy Member>

Figure 2:
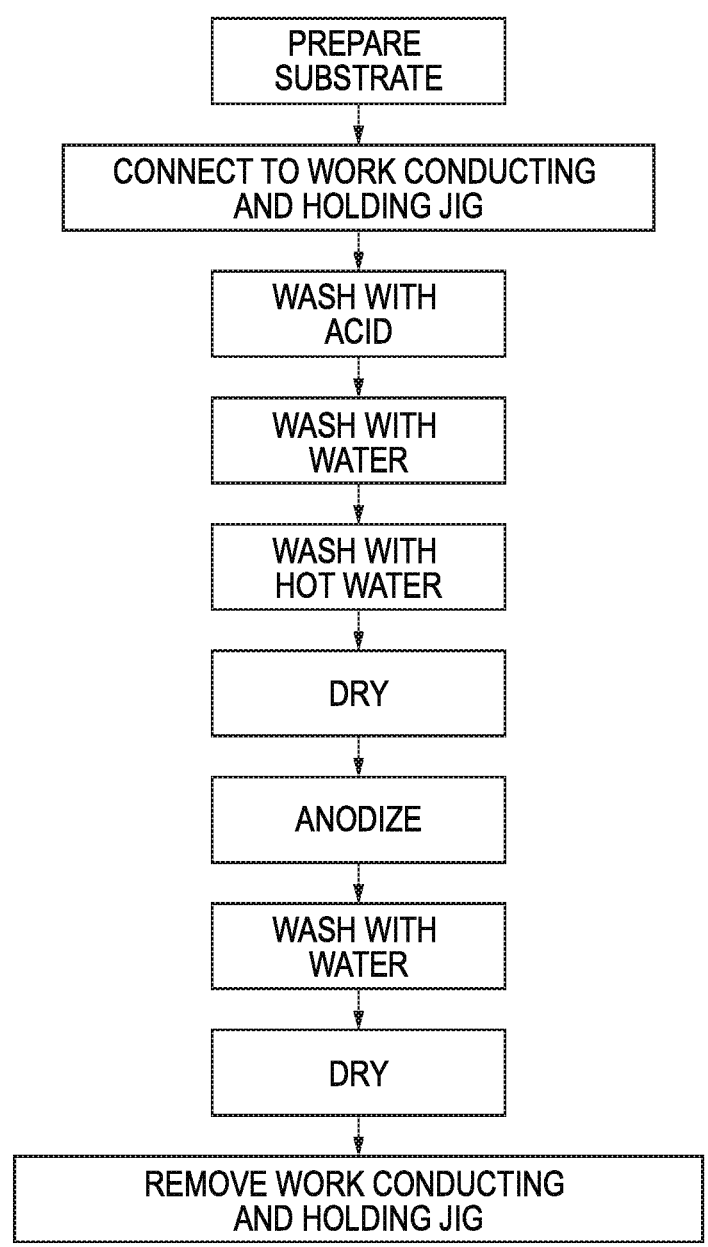
FIG. 2 is a flow chart illustrating manufacturing steps of an alloy member of the present invention.
Figure 3:
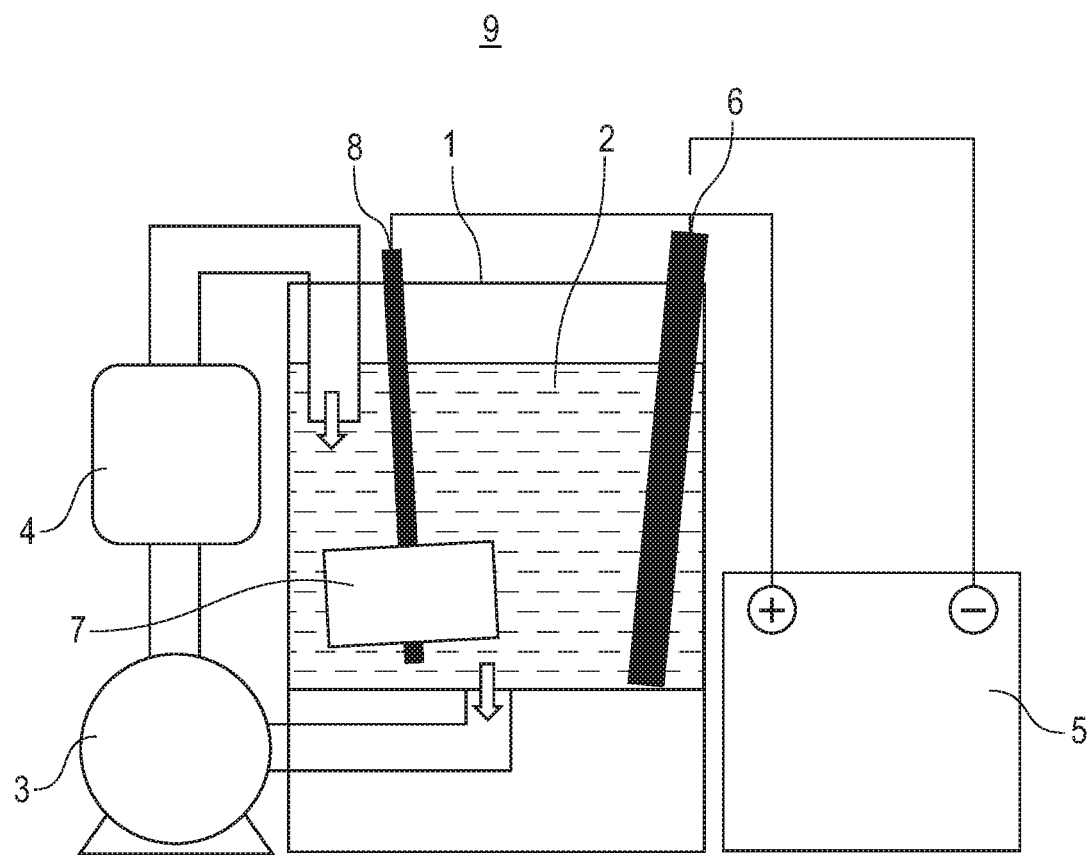
FIG. 3 is a schematic view illustrating an anodizing apparatus in manufacturing of an alloy member of the present invention.

FIG. 2 is a flow chart illustrating manufacturing steps of an alloy member of the present invention. FIG. 3 is a schematic view illustrating an anodizing apparatus in manufacturing of an alloy member of the present invention. With reference to FIG. 2 and FIG. 3, a manufacturing method of an alloy member of the present invention is described.

First, a substrate 7 made of Mg—Li alloy is provided.

Next, to the substrate 7, a work conducting and holding jig 8 made of the same material as the substrate 7 is connected. Specifically, connection is performed by bending the work conducting and holding jig 8 to put the substrate 7 therein.

Next, the substrate 7 and the work conducting and holding jig 8 is dipped in nitric acid (concentration: 3 to 5 mass %) to perform acid washing. The acid washing is performed to remove an oxide layer present in each of the surfaces of the substrate 7 and the work conducting and holding jig 8. The nitric acid may be replaced with an acid such as hydrochloric acid or sulfuric acid, and it is sufficient as long as it can dissolve and remove the oxide layer on the surface. After acid washing, the substrate 7 and the work conducting and holding jig 8 are washed with pure water shower. The substrate 7 and the work conducting and holding jig 8 are then dipped in pure water heated at 90 to 99° C. and pulled up for drying.

On the surface of the substrate 7 after subjected to such treatment, a fluorinated coating film is formed by anodization process using an anodizing apparatus 9.

Subsequently, the anodization process is described.

In a processing tank 1 for forming a fluorinated coating film on the substrate 7, a neutral ammonium fluoride solution is disposed as an electrolyte 2. The concentration of the neutral ammonium fluoride solution is preferably 181 g/L to 453 g/L, i.e., a saturated state. In order to completely fluorinate the surface of the Mg—Li alloy substrate, setting to a high concentration is preferable.

The aqueous solution of the electrolyte 2 is neutral, having a pH of desirably 6.0 or more and 8.0 or less. In an acidic condition with a reduced pH, hydrogen fluoride as toxic substance is formed. On the other hand, in an alkaline condition with an increased pH, the anodization involves not only a reaction with fluorine but also a reaction with oxygen. As a result, the content proportion of fluorine in the coating film is reduced. The pH can be in a range of 7.0 to 7.5. The reason is that with a pH in the range, a higher voltage is easily applied. In other words, using neutral ammonium fluoride as electrolyte, a voltage higher than usual can be applied, so that the fluorine content in the coating film to be formed can be increased.

The electrolyte 2 is circulated through piping from the bottom of a processing tank 1 to the top of the processing tank 1 via a pump 3 and a filter 4 to be stirred. Due to temperature increase caused by the pump 3, the electrolyte 2 can be subjected to temperature control by a chiller or the like. The preferred temperature of the electrolyte 2 is in a range of −20° C. to 60° C. Within this temperature range, the coating films to be formed have no particular difference.

The cathode of a power supply 5 is connected to a cathode electrode 6 dipped in the processing tank 1. Any material having good reactivity with the electrolyte may be used as the cathode electrode 6, and, for example, carbon, platinum, titanium and SUS may be used. Also, since the anode of the power source 5 is connected to the work conducting and holding jig 8 connected to the substrate 7, the substrate 7 and the work conducting and holding jig 8 function as an anode electrode.

Figure 4:
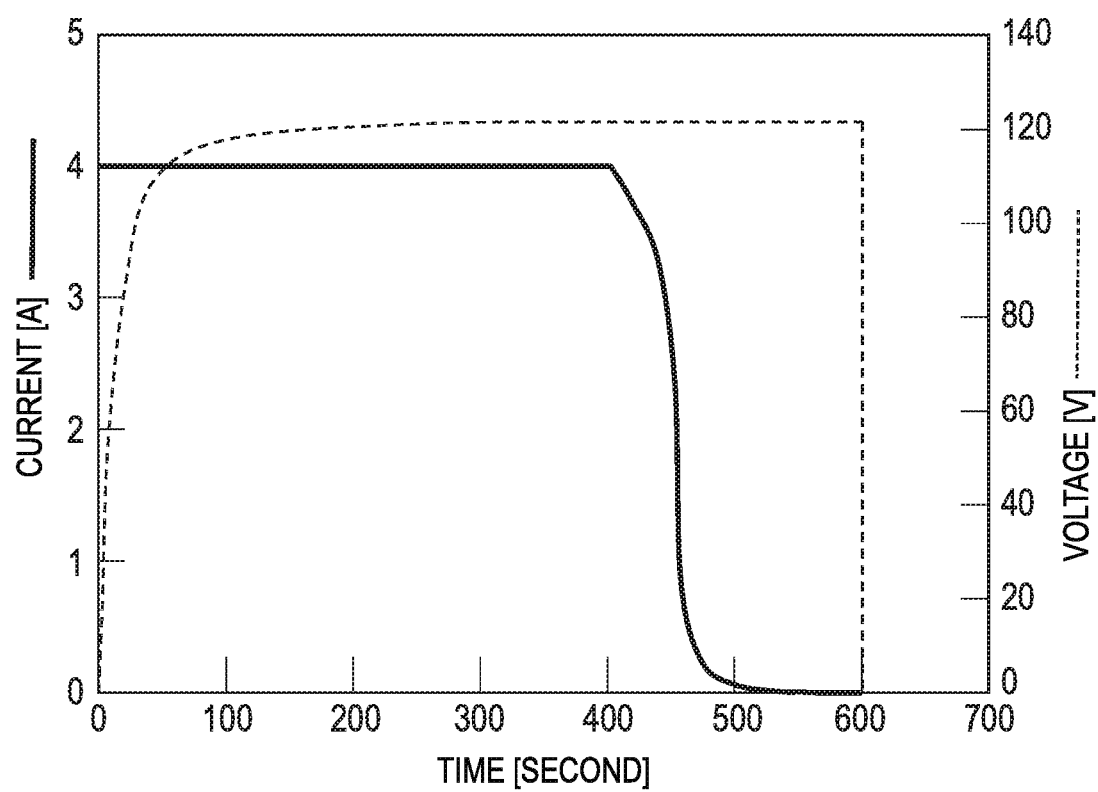
FIG. 4 is a chart illustrating a current-voltage curve in formation of a coating film in an aspect.

After completion of the connection to the power supply, voltage is applied. FIG. 4 is a chart illustrating a current-voltage curve in formation of a fluorinated coating film in an aspect. The horizontal axis is time [unit: seconds], and the vertical axis is current [unit: A] or voltage [unit: V], and the solid line represents current, and the broken line represents voltage. The starting point of voltage application is set at 0 seconds, and at the beginning of voltage application, a constant current is made to flow by constant current control. The current flow causes a fluorinated coating film to grow on the surface of the substrate 7. When the fluorinated coating film grows to a certain thickness, the current is suppressed along with increase in the surface resistance. Due to the constant current control, the voltage gradually increases in parallel with the suppression of the current. At the time point when the voltage increases to a set value, a change is made to a constant voltage control, so that the voltage is controlled at constant. At this point of time, the current rapidly decreases. When the current is sufficiently lowered (for example, when lowered to 0.01 A or less), the conduction is stopped. In order to obtain a desired film thickness, the voltage supply may be stopped when a predetermined amount of electricity (current times the integral of time) flows.

The film thickness of the fluorinated coating film can be approximately determined by the set voltage, which can preferably be 121 V or more in a case the rolled plate material LZ91 is used as the substrate. With a set voltage of less than 121 V, the film thickness of the fluorinated coating film may not be sufficiently thick. On the other hand, although as the set voltage increases, the fluorinated coating film is more easily formed thicker, the fluorinated coating film may be made porous structure with a set voltage of more than 157 V. In the case where the film thickness exceeds 80 μm, an arc discharge occurs to cause dielectric breakdown, and the fluorinated film may have a porous structure. Also, although the set current value is not particularly limited, the growth of the fluorinated coating film needs a long time in the case of a low set current value. The set current value is, therefore, desirably 1 A or more, though depending on the surface area of the substrate.

Subsequently, after washing with water and drying, the work conducting and holding jig 8 is removed from the substrate 7, so that an alloy member having a fluorinated coating film of the present invention which has a fluorinated coating film on the Mg—Li alloy substrate can be obtained.

<Imaging Apparatus>

Figure 5:
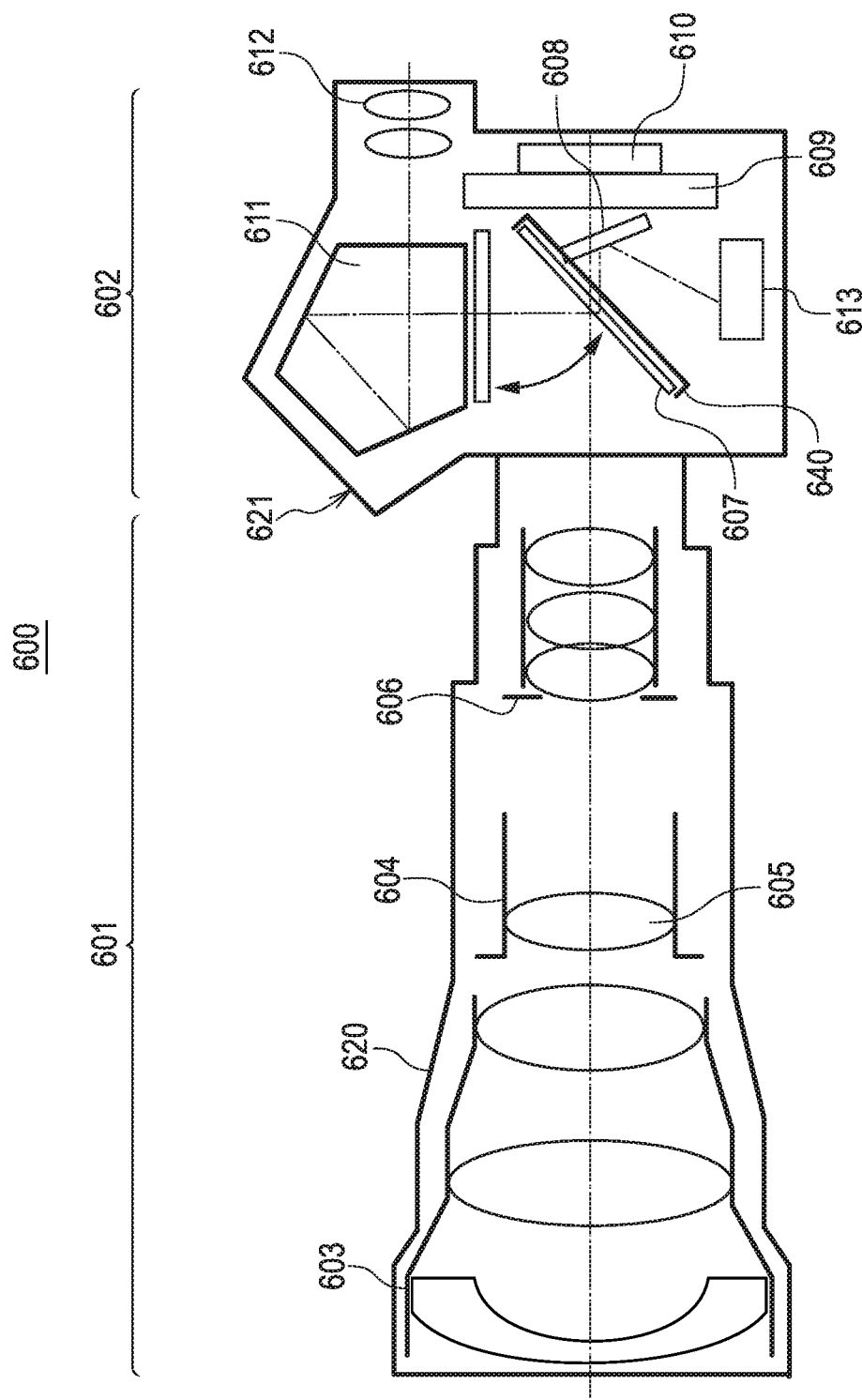
FIG. 5 is a schematic view illustrating an imaging apparatus of the present invention.

FIG. 5 illustrates the structure of a digital single-lens reflex camera 600 as imaging apparatus of the present invention in a preferred embodiment. In FIG. 5, a camera body 602 and a lens barrel 601 as an optical apparatus are connected, though the lens barrel 601 is a so-called interchangeable lens which is detachable from the camera body 602.

Light from an object passes through an optical system including a plurality of lenses 603 and 605 disposed on the optical axis of an imaging optical system in the casing of the lens barrel 601 to be received by an imaging device for photographing. The lens 605 is supported by an internal cylinder 604, so as to be movable to the external cylinder of the lens barrel 601 for focusing and zooming.

In the observation period before photographing, light from an object is reflected by a main mirror 607 in the casing 621 of a camera body. After the light passes through a prism 611, an image to be photographed is shown to a photographer through a finder lens 612. The main mirror 607 is, for example, a half mirror, and the light transmitting through the main mirror is reflected to the direction of an AF (autofocus) unit 613 by a sub mirror 608, so that the reflected light is used, for example, for measurement of distance. The main mirror 607 is mounted and supported on a main mirror holder 640 by adhesion or the like. During photographing, the main mirror 607 and the sub mirror 608 are moved out of the optical path through a driving mechanism not shown in drawing and a shutter 609 is opened, so that a light image to be photographed which is incident from the lens barrel 601 is imaged on an imaging device 610. A diaphragm 606 allows the brightness during photographing and the depth of focus to be changed through the change of aperture area.

The alloy member of the present invention may be used as a casing 620. The casing 620 may include the alloy member of the present invention alone or may have a coat on the alloy member of the present invention. Since the alloy member of the present invention is lightweight and excellent in corrosion resistance, an imaging apparatus which is more light weight and more excellent in corrosion resistance than conventional imaging apparatuses can be provided.

Although a digital single-lens reflex camera has been described as an example of the imaging apparatus of the present invention, the present invention is not limited thereto and may include a smartphone and a compact digital camera.

<Electronic Apparatus>

Figure 6:
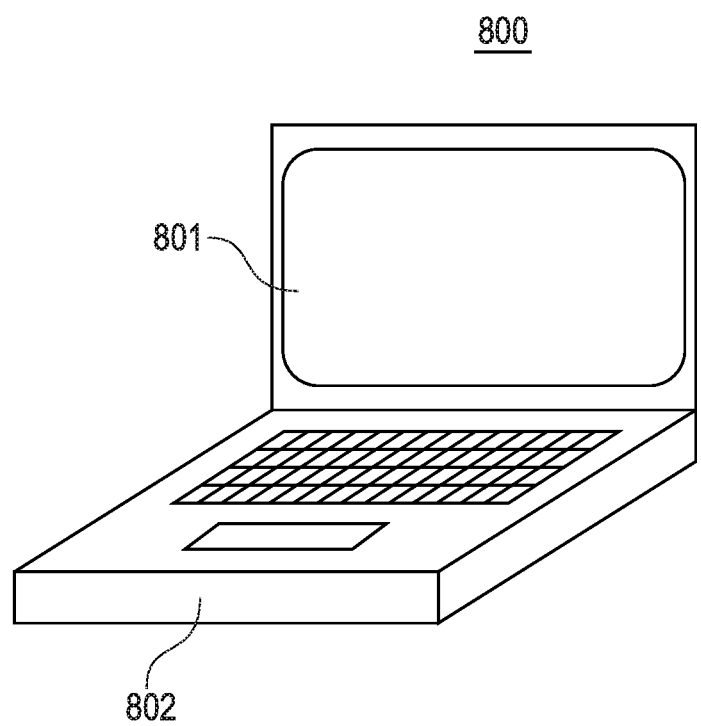
FIG. 6 is a schematic view illustrating an electronic apparatus of the present invention.

FIG. 6 illustrates a structure of a personal computer as an example of the electronic apparatus of the present invention in a preferred embodiment. In FIG. 6, a personal computer 800 includes a display part 801 and a body part 802. In the body part 802, electronic components not shown in drawing are provided. The alloy member of the present invention can be used as the casing of the body part 802. The casing may include the alloy member of the present invention alone or may have a coat on the alloy member of the present invention. Since the alloy member of the present invention is lightweight and excellent in corrosion resistance, a personal computer which is more light weight and more excellent in corrosion resistance than conventional personal computers can be provided.

Although a personal computer has been described as an example of the electronic apparatus of the present invention, the present invention is not limited thereto and may include a smartphone and a tablet.

<Mobile Object>

Figure 7:
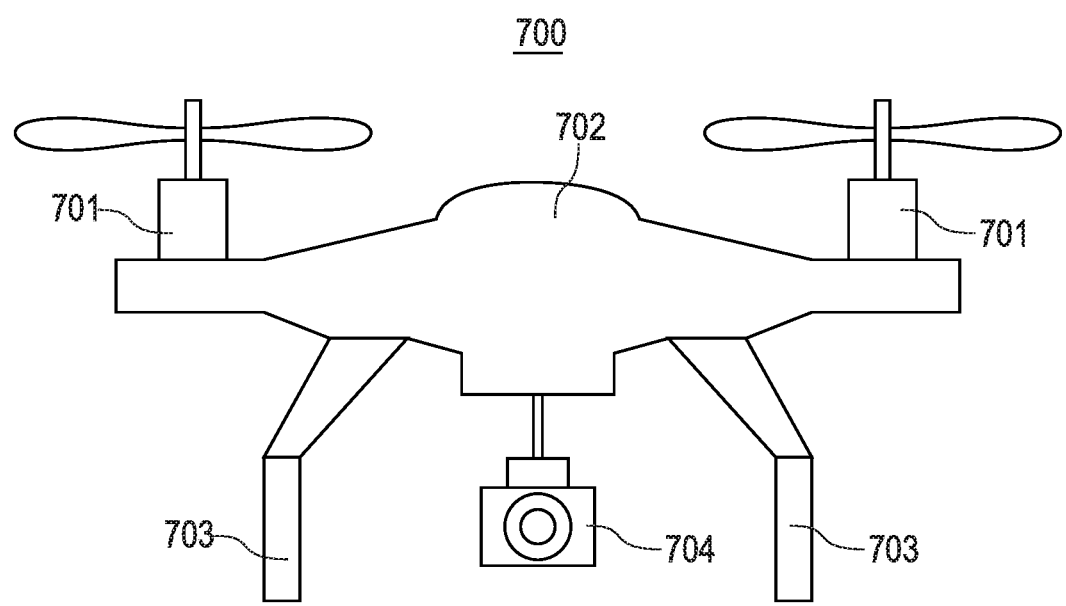
FIG. 7 is a schematic view illustrating a mobile object of the present invention.

FIG. 7 illustrates a drone in an embodiment as an example of the mobile object of the present invention. A drone 700 includes a plurality of moving units 701 and a body part 702 connected to the moving units 701. The moving unit has, for example, a propeller. As illustrated in FIG. 7, to the body part 702, a leg part 703 may be connected or a camera 704 may be connected. The alloy member of the present invention may be used as a casing of the body part 702 and the leg part 703. The casing may include the alloy member of the present invention alone or may have a coat on the alloy member of the present invention. Since the alloy member of the present invention is excellent in damping properties and corrosion resistance, a drone which is more excellent in damping properties and corrosion resistance than conventional drones can be provided.

Although a drone has been described as an example of the mobile object of the present invention, the present invention is not limited to a flying object such as drone and may include a mobile object moving on the ground.

EXAMPLES

The present invention is described with reference to Examples as follows.

<Manufacturing of Alloy Member>

Example 1

A rolled member LZ91 (composition: Mg-9% Li-1% Zn, manufactured by Amli Materials Technology Co., Ltd.) was provided as a substrate 7. The size thereof was set to 40 mm by 40 mm by 3 mm.

Next, the substrate 7 and a work conducting and holding jig 8 made of LZ91 were dipped in nitric acid with a concentration of 4 mass % for 30 seconds to be acid washed. The substrate 7 and the work conducting and holding jig 8 were then washed with pure water. Further, the substrate 7 and the work conducting and holding jig 8 were dipped in pure water heated at 95° C., and then dried. The anodizing apparatus illustrated in FIG. 3 was assembled from a cathode 6 made of carbon and an anode made of the substrate 7 and the work conducting and holding jig 8.

A solution of neutral ammonium fluoride with a concentration of 453 g/L (pH=7.0) was provided as an electrolyte 2. The temperature of the electrolyte 2 was controlled to 0° C.±1° C. by a chiller.

The anodization conditions were according to the current-voltage curve as illustrated in FIG. 4, with a set voltage value of 121 V and a set current value of 3 A.

After 40 seconds from voltage application, the voltage reached 115 V, so that the current decreased from 3 A. After 30 minutes from voltage application, the current value reached 0.01 A. The voltage application was therefore cut off to obtain an alloy member of Example 1.

Example 2

An alloy member of Example 2 was manufactured under the same conditions as in Example 1, except that the temperature of the electrolyte 2 was controlled to 25° C. by a chiller, the set voltage value was controlled to 121 V and the set current value was controlled to 4 A.

After 54 seconds from voltage application, the voltage reached 122 V, so that the current decreased from 4 A. After 26 minutes from voltage application, the current value reached 0.01 A. The voltage application was therefore cut off to obtain an alloy member of Example 2.

Example 3

An alloy member of Example 3 was manufactured under the same conditions as in Example 1, except that the temperature of the electrolyte 2 was controlled to 10° C. by a chiller, the set voltage value was controlled to 126 V and the set current value was controlled to 4 A.

After 6 minutes and 36 seconds from voltage application, the voltage reached 126 V, so that the current decreased from 4 A. After 13 minutes from voltage application, the current value reached 0.007 A. The voltage application was therefore cut off to obtain an alloy member of Example 3.

Example 4

An alloy member of Example 4 was manufactured under the same conditions as in Example 2, except that the temperature of the electrolyte 2 was controlled to 5° C. by a chiller, the concentration of the electrolyte 2 was 344 g/L, the set voltage value was controlled to 128 V and the set current value was controlled to 4 A.

After 10 minutes and 24 seconds from voltage application, the voltage reached 128 V, so that the current decreased from 4 A. After 11 minutes and 42 seconds from voltage application, the current value reached 0.007 A. The voltage application was therefore cut off to obtain an alloy member of Example 4.

Example 5

A rolled plate material LA143 (composition: Mg-14% Li-3% Al, manufactured by Santoku Corporation) was provided as a substrate 7. The size thereof was to 40 mm by 40 mm by 3 mm. A work conducting and holding jig 8 is also made of LA143. An alloy member of Example 5 was manufactured under the same conditions as in Example 3, except that the temperature of the electrolyte 2 was controlled to 5° C. by a chiller and the set voltage value was controlled to 123 V.

After 5 minutes and 12 seconds from voltage application, the voltage reached 126 V, so that the current decreased from 4 A. After 14 minutes and 54 seconds from voltage application, the current value reached 0.009 A. The voltage application power was therefore cut off to obtain an alloy member of Example 5.

Example 6

As a substrate 7, LA149 (composition: Mg-14% Li-9% Al, manufactured by Santoku Corporation) was thixomolded into a cylindrical cup having a diameter of 60 mm, a thickness of 4 mm and a height of 60 mm. A work conducting and holding jig 8 is also made of LA149. An alloy member of Example 6 was manufactured under the same conditions as in Example 5, except that the set voltage value was controlled to 115 V.

After 59 minutes and 42 seconds from voltage application, the voltage reached 115 V, so that the current decreased from 4 A. After 68 minutes and 42 seconds from voltage application, the current value reached 0.01 A. The voltage application was therefore cut off to obtain an alloy member of Example 6.

Example 7

As a substrate 7, Ares (composition: Mg-8% Li-3% Al, Amli Materials Technology Co., Ltd.) was forgingmolded into a cylindrical cup having a diameter of 60 mm, a thickness of 2 mm and a height of 40 mm. A work conducting and holding jig 8 is also made of Ares. A solution of neutral ammonium fluoride with a concentration of 268 g/L (pH=7.0) was provided as an electrolyte 2. The temperature of the electrolyte 2 was controlled to 20° C.±1° C. by a chiller.

A voltage of 126 V was applied, a current of 4 A was allowed to flow for 18 minutes and 20 seconds, and then the voltage was turned off. At this time, the amount of electricity flowing into the work was 4400 coulombs, and the alloy member of Example 7 having a fluorinated film having a thickness of 48 μm was obtained.

Example 8

The alloy member of Example 8 was produced under the same conditions as Example 4 except that the concentration of the electrolytic solution 2 was 181 g/L and the set voltage was 155 V.

After 13 minutes and 10 seconds from the application of the voltage, the voltage became 155 V, and the current dropped from 4A. Since the current value became 0.007 A 16 minutes and 55 seconds after the voltage application, the voltage application was stopped, and the alloy member of Example 8 was obtained.

Comparative Example 1

An alloy member of Comparative Example 1 was manufactured under the same conditions as in Example 1, except that the set voltage value was controlled to 100 V.

After 15 seconds from voltage application, the voltage reached 100 V, so that the current decreased from 3 A. After 5 minutes and 36 seconds from voltage application, the current value reached 0.004 A. The voltage application was therefore cut off to obtain an alloy member of Comparative Example 1.

Comparative Example 2

An alloy member of Comparative Example 2 was manufactured under the same conditions as in Comparative Example 1, except that the set voltage value was controlled to 105 V.

After 14 seconds from voltage application, the voltage reached 105 V, so that the current decreased from 3 A. After 8 minutes and 24 seconds from voltage application, the current value reached 0.006 A. The power was therefore cut off to obtain an alloy member of Comparative Example 2.

Comparative Example 3

An alloy member of Comparative Example 3 was manufactured under the same conditions as in Comparative Example 1, except that the set voltage value was controlled to 110 V.

After 20 seconds from voltage application, the voltage reached 110 V, so that the current decreased from 3 A. After 22 minutes and 30 seconds from voltage application, the current value reached 0.004 A. The power was therefore cut off to obtain an alloy member of Comparative Example 3.

Comparative Example 4

An alloy member of Comparative Example 4 was manufactured under the same conditions as in Comparative Example 1, except that the set voltage value was controlled to 120 V.

After 47 seconds from voltage application, the voltage reached 120 V, so that the current decreased from 4 A. After 14 minutes from voltage application, the current value reached 0.001 A. The voltage application was therefore cut off to obtain an alloy member of Comparative Example 4.

Reference Example 1

A rolled member LZ91 (composition: Mg-9% Li-1% Zn, manufactured by Amli Materials Technology Co., Ltd.) for use in Example 1 was provided as a substrate 7. A substrate in Reference Example 1 was obtained without anodization after subjected to acid washing, washing with water, washing with hot water and drying under the same conditions as in Example 1.

Reference Example 2

A rolled plate material LA143 (composition: Mg-14% Li-3% Al, manufactured by Santoku Corporation) for use in Example 5 was provided as a substrate 7. A substrate in Reference Example 2 was obtained without anodization after subjected to acid washing, washing with water, washing with hot water and drying under the same conditions as in Reference Example 1.

Reference Example 3

A cylindrical cup having a diameter of 60 mm, a thickness of 4 mm and a height of 60 mm thixomolded from LA149 (composition: Mg-14% Li-3% Al, manufactured by Santoku Corporation) for use in Example 6 was prepared as a substrate 7. A substrate in Reference Example 3 was obtained without anodization after subjected to acid washing, washing with water, washing with hot water and drying under the same conditions as in Reference Example 1.

<Evaluation of Alloy Member>

Evaluation of the alloy members of Examples 1 to 6 and Comparative Examples 1 to 4, and the substrates in Reference Examples 1 to 3 was performed according to the following procedure. The results are summarized in Table 1. The analysis results and the various test results are described in Table 1.

The contents in Table 1 are described as follows.

(EDS Elemental Analysis Results)

The elemental analysis of each of the alloy members and the substrates was performed by EDS (energy-dispersive X-Ray spectrometer).

In EDS elementary analysis, an FE-SEM apparatus manufactured by Carl Zeiss AG was used. The measurement in the EDS elementary analysis was performed under conditions with an acceleration voltage of 13 kV and a work distance of 9.87 to 9.97 mm in a visual field range at a magnification of 114.

The results are described in column "Element proportion in EDS analysis [atom %]" in Table 1.

(Film Thickness)

The film thickness was measured using an eddy current film thickness meter STW-9000 and a film thickness probe NFe-2.0 manufactured by Sanko Electronic Laboratory Co., Ltd.

The results are described in column "Film thickness [μm]" in Table 1.

(Durability Test at Constant Temperature and Humidity)

In the durability test at constant temperature and humidity, the alloy member or the substrate was left standing in an environment at a temperature of 55° C. and a humidity of 95% for 1000 hours to be checked for the presence or absence of a change in appearance. The appearance was evaluated by visual observation and microscopic observation with magnifications of 50 and 200. The results are shown in column "Durability test at constant temperature and humidity" in Table 1. "A" represents that no change in appearance was present between before and after the durability test. "B" represents that a change in appearance was present between before and after the durability test.

(Dipping Test in Pure Water)

In the dipping test in pure water, the alloy member or the substrate was dipped in pure water and evaluated based on the foam density on the surface after 24 hours. The foam density was defined as the value obtained by dividing the number of pieces of foams attached to the entire surface by the surface area. The alloy member or the substrate to which 10 or more foams per square cm are attached were described as ">10".

(Durability Test of Coat)

A coat was disposed on the alloy member or the substrate, and an evaluation test was performed under the same temperature and humidity conditions as in the durability test at constant temperature and humidity.

The coat was disposed using a typical baking paint for magnesium (manufactured by Kawakami Paint Mfg. Co., Ltd.) through baking of a primer at 150° C. for 20 minutes and baking of an overcoat layer at 150° C. for 20 minutes. The primer layer had a film thickness of 15±5 µm, and the overcoat layer had a film thickness of 20±5 µm.

the coat, the composition distribution in the thickness (depth) direction of the fluorinated coating film was measured by XPS (X-ray photoelectron spectroscopy) analysis.

As the XPS analysis apparatus, PHI Quantera II manufactured by ULVAC-PHI, Inc., was used. Under X-ray irradiation conditions at 15 kV, 25 W, with an Ar sputtering energy of 69 eV, the measurement was performed for a region of 200 µm by 200 µm in the thickness direction. The position in the thickness direction was calculated by measuring the etching depth after measurement with a laser microscope VR-3000 manufactured by Keyence Corporation and then allocating the etching time to each of the measurement points.

Figure 8:
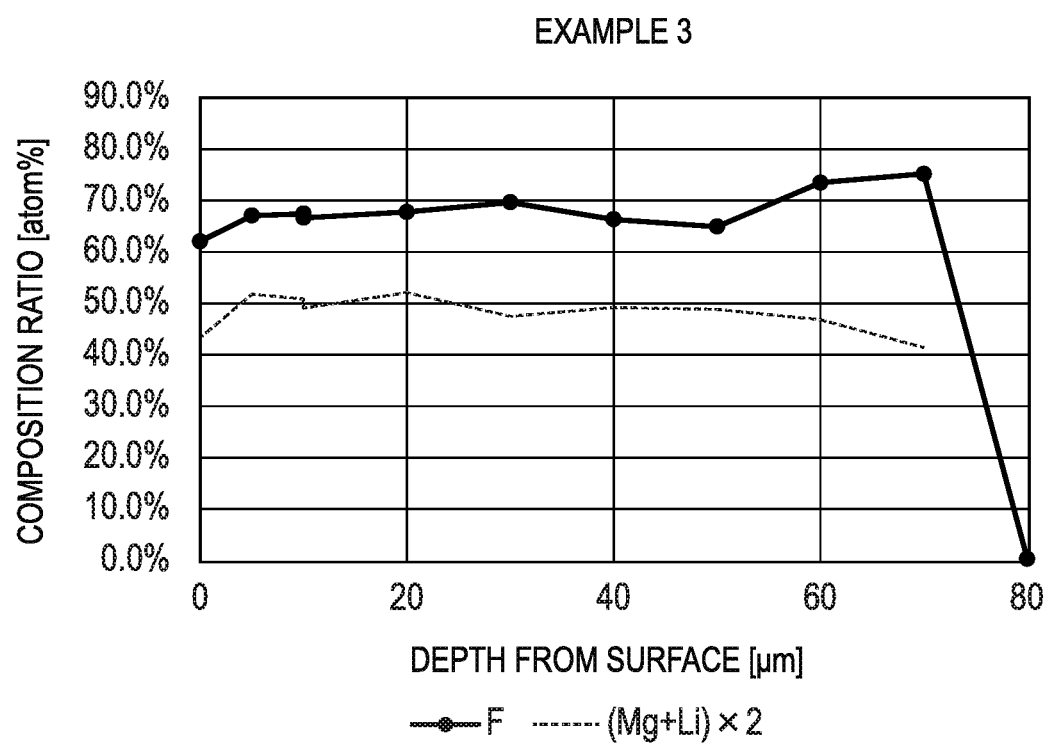
FIG. 8 is a chart illustrating a composition distribution in the thickness direction of a coating film in Example 3.

Under the conditions described above, XPS analysis of the fluorinated coating film of each of the alloy members obtained in Example 3, Example 2, Example 1 and Comparative Example 3 was performed. The elemental composition distribution in the thickness direction of the fluorinated coating film by XPS analysis is illustrated in FIG. 8 to

TABLE 1

|  | Substrate | Voltage [V] | Element proportion in EDS analysis [atom %] | | | | | Film thickness [µm] | Durability test at constant temperature and humidity | Dipping test in pure water [pieces/cm$^2$] | Durability test of coat |
|  |  |  | Mg + Li | O | F | C | Others |  |  |  |  |
| --- | --- | --- | --- | --- | --- | --- | --- | --- | --- | --- | --- |
| Example 1 | Rolled plate LZ91 | 121 | 32% | 3% | 64% | 0% | 1% | 25 | A | 0.25 | A |
| Example 2 | Rolled plate LZ91 | 124 | 28% | 2% | 70% | 0% | 0% | 45 | A | 0 | A |
| Example 3 | Rolled plate LZ91 | 126 | 28% | 2% | 70% | 0% | 0% | 80 | A | 0 | A |
| Example 4 | Rolled plate LZ91 | 128 | 27% | 3% | 70% | 0% | 0% | 50 | A | 0 | A |
| Example 5 | Rolled plate LA143 | 126 | 27% | 3% | 70% | 0% | 0% | 73 | A | 0 | A |
| Example 6 | Molding material LA149 | 126 | 26% | 2% | 70% | 0% | 2% | 70 | A | 0 | A |
| Example 7 | Ares | 126 | 28% | 2% | 70% | 0% | 0% | 48 | A | 0 | A |
| Example 8 | Rolled plate LZ91 | 182 | 28% | 2% | 70% | 0% | 0% | 60 | A | 0 | A |
| Comparative Example 1 | Rolled plate LZ91 | 100 | 34% | 12% | 49% | 3% | 2% | 16 | B | >10 | B |
| Comparative Example 2 | Rolled plate LZ91 | 105 | 48% | 7% | 25% | 18% | 2% | 16 | B | >10 | B |
| Comparative Example 3 | Rolled plate LZ91 | 113 | 49% | 5% | 36% | 10% | 0% | 17 | B | >10 | B |
| Comparative Example 4 | Rolled plate LZ91 | 120 | 31% | 10% | 50% | 7% | 2% | 18 | B | >10 | B |
| Reference Example 1 | Rolled plate LZ91 | — | 52% | 28% | 0% | 13% | 7% | — | B | >10 | B |
| Reference Example 2 | Rolled plate LA143 | — | 57% | 23% | 0% | 17% | 3% | — | B | >10 | B |
| Reference Example 3 | Molding material LA149 | — | 46% | 25% | 0% | 19% | 10% | — | B | >10 | B |

From the results described in Table 1, it was found that the alloy member having a fluorine content of more than 50 atom % and an oxygen content of less than 5 atom % in EDS elemental analysis caused no coat to swell or peel off even after the durability test of the coat.

Also, the alloy member in each of Examples had a very few number of foams of hydrogen gas or caused no foaming. It is therefore conceivable that lithium and magnesium present in the substrate surface and the coating film are in an inactive state which is not a released state.

Also, the alloy member had a fluorinated coating film having a thickness of 25 µm or more.

In contrast, all in Comparative Examples 1 to 4 and Reference Examples 1 to 3, which were subjected to a film thickness of less than 25 µm, caused the coat to swell or peel off after the durability test of the coat. All in Comparative Examples 1 to 4 and Reference Examples 1 to 3 had a fluorine content of less than 50 atom % and an oxygen content of 5 atom % or more.

Figure 9:
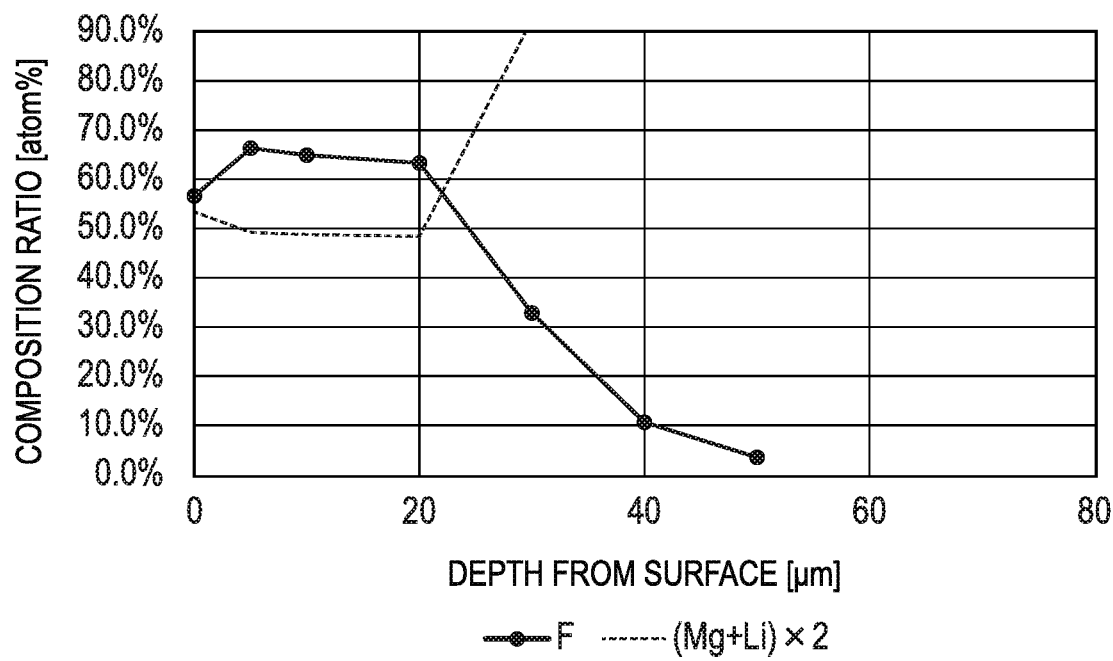
FIG. 9 is a chart illustrating a composition distribution in the thickness direction of a coating film in Example 2.
Figure 10:
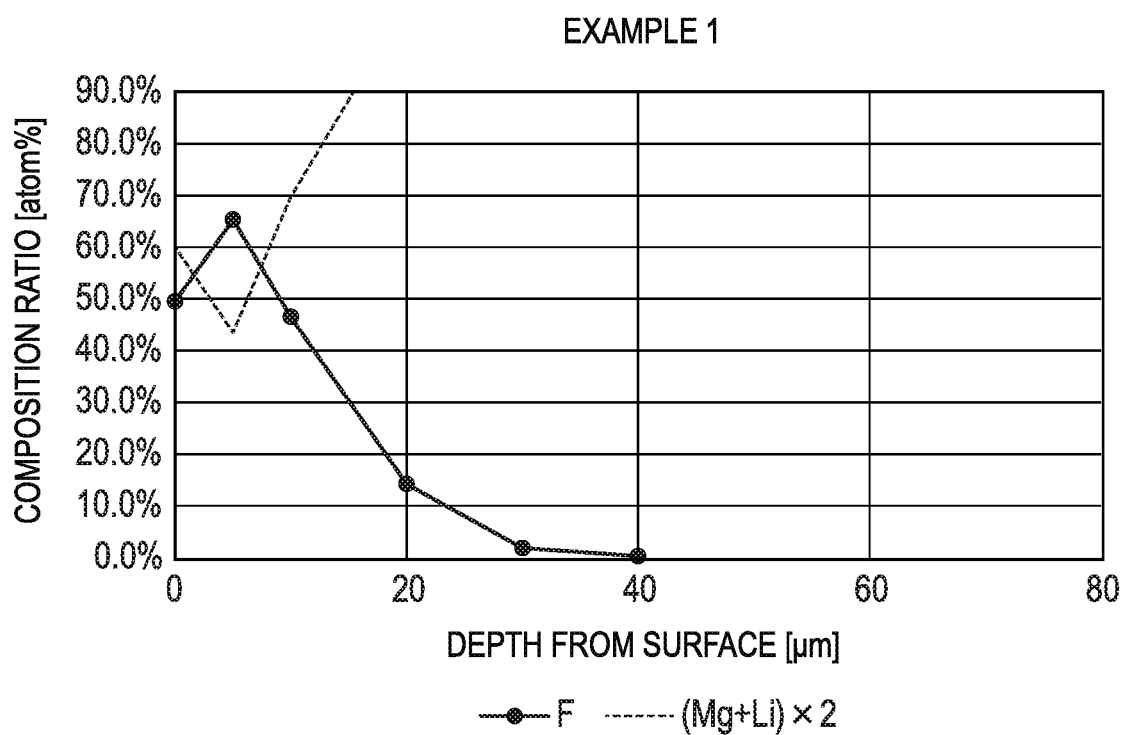
FIG. 10 is a chart illustrating a composition distribution in the thickness direction of a coating film in Example 1.
Figure 11:
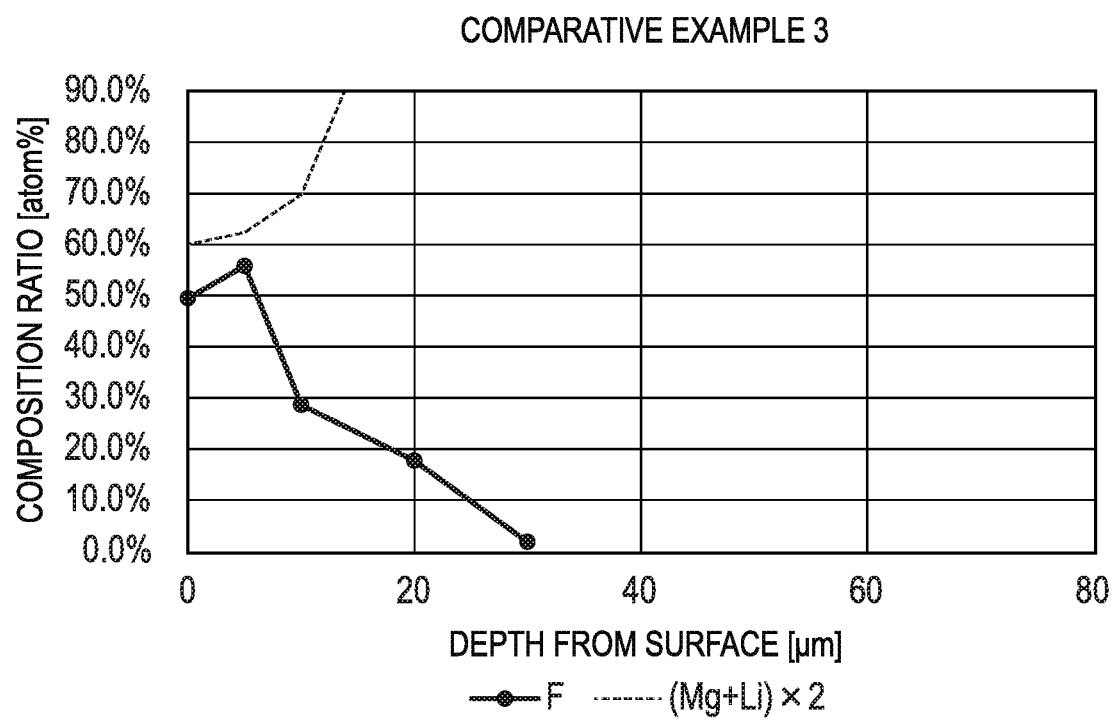
FIG. 11 is a chart illustrating a composition distribution in the thickness direction of a coating film in Comparative Example 3.

Next, in order to reveal the detailed structure of the fluorinated coating film having good results in durability of FIG. 11. FIG. 8 illustrates the results in Example 3, FIG. 9 illustrates the results in Example 2, FIG. 10 illustrates the results in Example 1, and FIG. 11 illustrates the results in Comparative Example 3.

In FIG. 8 to FIG. 11, the vertical axis represents the composition proportion of elements and the horizontal axis represents the depth from the surface of the fluorinated coating film. The solid line corresponds to the content proportion of fluorine, and the broken line corresponds to two times the sum of the content proportion of magnesium and lithium. It is found that the alloy members illustrated in FIG. 8 to FIG. 10 according to the present invention have a region where the fluorine concentration (solid line) is higher than two times the concentration of Mg and Li ingredients (broken line).

On the other hand, FIG. 11 illustrates the elemental composition distribution in the thickness direction of a fluorinated coating film in Comparative Example 3 by XPS analysis. Based on the chart, it is found that no region where the fluorine atom concentration (solid line) is higher than two times the concentration of Mg and Li ingredients (broken line) is present.

In such a structure, no surplus fluorine is present, so that the activity of the occurring active lithium and magnesium cannot be suppressed. It is therefore presumed that the active species react with water and air, so that the deterioration of durability proceeds.

As described above, the alloy substrate of the present invention includes a coating film having stability against oxygen in water and air, so that the structure thereof has stability for a long period, without occurrence of foaming even when dipped in water.

According to the present invention, a coating film containing a large amount of fluorine can be formed on the surface of magnesium-lithium alloy, which has not been achieved by conventional methods. As a result, a magnesium-lithium alloy member capable of inhibiting corrosion even when exposed to a high temperature and high humidity environment for a long period can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-235922, filed Dec. 17, 2018, and Japanese Patent Application No. 2019-218402, filed Dec. 2, 2019 which are hereby incorporated by reference herein in their entirety.

What is claimed is:

1. An alloy member comprising:
   a substrate made of magnesium-lithium alloy with a sum of content of magnesium and content of lithium of 90 mass % or more; and
   a coating film disposed on the substrate, wherein the coating film contains fluorine and oxygen, with a fluorine content of at least 64 atom %, and an oxygen content of less than 5 atom %.

2. The alloy member according to claim 1, wherein the coating film has a thickness of 20 μm or more.

3. The alloy member according to claim 1, wherein the coating film has a fluorine content of 70 atom % or less and an oxygen content of 2 atom % or more.

4. The alloy member according to claim 1, wherein the coating film contains magnesium and lithium, and when the fluorine content is represented by M1 atom % and a sum of the contents of magnesium and lithium is represented by M2 atom %, a region where M1 is two times or more M2 is formed up to a location 10 μm deep from a surface of the coating film facing away from the substrate in a thickness direction of the coating film.

5. The alloy member according to claim 4, wherein the region where M1 is two times or more M2 is formed on the surface of the coating film.

6. The alloy member according to claim 1, wherein the coating film contains magnesium and lithium, and when the fluorine content is represented by M1 atom % and a sum of contents of magnesium and lithium is represented by M2 atom %, a region where M1 is two times or more M2 is continuously formed up to 20 μm from a surface of the coating film facing away from the substrate in a thickness direction of the coating film.

7. An optical apparatus comprising a casing and an optical system including a plurality of lenses in the casing, wherein the casing has an alloy member comprising:
   a substrate made of magnesium-lithium alloy with a sum of content of magnesium and content of lithium of 90 mass % or more; and
   a coating film disposed on the substrate, wherein the coating film contains fluorine and oxygen, with a fluorine content of at least 64 atom %, and an oxygen content of less than 5 atom %.

8. An imaging apparatus comprising a casing, an optical system including a plurality of lenses in the casing, and an imaging device for receiving light passing through the optical system,
   wherein the casing has the alloy member according to claim 1.

9. The imaging apparatus according to claim 8, wherein the imaging apparatus is a camera.

10. An electronic apparatus comprising a casing and an electronic component in the casing,
    wherein the casing has the alloy member according to claim 1.

11. A mobile object comprising a body part and a plurality of moving units connected to the body part,
    wherein the body part includes a casing having the alloy member according to claim 1.

12. A method for manufacturing an alloy member, comprising:
    providing a substrate made of magnesium-lithium alloy with a sum of content of magnesium and content of lithium of 90 mass % or more;
    disposing a cathode substrate and the substrate made of magnesium-lithium alloy as an anode in an aqueous solution of neutral ammonium fluoride; and
    applying a voltage between the anode and the cathode to dispose a coating film on the substrates;
    wherein the coating film contains fluorine and oxygen, with a fluorine content of at least 64 atom % and an oxygen content of less than 5 atom %.

13. The method for manufacturing the alloy member according to claim 12, wherein the concentration of the aqueous solution of neutral ammonium fluoride is more than 181 g/L.

* * * * *